United States Patent [19]

Tollefson

[11] Patent Number: 5,332,172
[45] Date of Patent: Jul. 26, 1994

[54] TAPERED REEL PRESSURE SPRING

[75] Inventor: Dale T. Tollefson, Woodbury, Minn.

[73] Assignee: Minnesota Mining and Manufacturing Company, St. Paul, Minn.

[21] Appl. No.: 562,883

[22] Filed: Aug. 6, 1990

[51] Int. Cl.[5] ............................................. G11B 23/02
[52] U.S. Cl. ............................................. 242/345.2
[58] Field of Search ................. 242/199, 198; 360/132

[56] References Cited

U.S. PATENT DOCUMENTS

| | | | |
|---|---|---|---|
| 4,368,860 | 1/1983 | Goto | 242/199 |
| 4,449,676 | 5/1984 | Ogata et al. | 242/198 |
| 4,496,118 | 1/1985 | Oishi et al. | 242/198 |
| 4,504,028 | 3/1985 | Goto | 242/198 |
| 4,544,062 | 10/1985 | Maehara | 206/509 |
| 4,593,868 | 6/1986 | Sato et al. | 242/199 |
| 4,662,579 | 5/1987 | Gelardi et al. | 242/199 |
| 4,685,638 | 8/1987 | Satoyoshi et al. | 242/199 |
| 4,717,091 | 1/1988 | Schoettle et al. | 242/199 |
| 4,770,367 | 9/1988 | Carroll | 242/199 |
| 4,899,243 | 2/1990 | Bordignon | 242/199 |

FOREIGN PATENT DOCUMENTS

| | | | |
|---|---|---|---|
| 56-71865 | 6/1981 | Japan | 360/132 |

OTHER PUBLICATIONS

Article from Mechanical Springs, by A. M. Wahl, Chapter XVI, "Flat and Leaf Springs" (pp. 286-288), 1949.

Primary Examiner—Daniel P. Stodola
Assistant Examiner—John Q. Nguyen
Attorney, Agent, or Firm—Gary L. Griswold; Walter N. Kirn; Charles D. Levine

[57] ABSTRACT

A reel spring for use in a magnetic tape reel cassette, having a longer longitudinal axis and a shorter transverse axis is disclosed. The reel spring includes two arms joined at the central transverse axis which has the smallest transverse width of the reel spring. The arms extend longitudinally from the central transverse axis to respective ends, and increase uniformly in transverse width toward the ends to form a bow-tie shape. The reel spring also includes transverse crimps which define a central base portion and two end portions extending at an angle from the central base portion to provide a biasing force. Two openings are formed in the central base portion to mount the reel spring in the cassette. The openings are spaced from the transverse axis on opposite sides of the longitudinal axis.

10 Claims, 2 Drawing Sheets

TAPERED REEL PRESSURE SPRING

TECHNICAL FIELD

The present invention relates to reel pressure springs used in video cassette cartridges. More particularly, the present invention relates to reel pressure springs having tapered sides and improved working characteristics.

BACKGROUND OF THE INVENTION

Magnetic tape cartridges used in video cassette recorders include a pair of tape reels mounted in the cassette housing. Typically, these cassettes include a reel pressure spring mounted in a central portion of the upper housing of the cassette which places a downward force on the tape reels to maintain proper position and rotation of the tape reels. The spring is mounted at a central portion to the upper housing of the cassette and extends as arms which contact and bias the tape reels. Numerous reel spring configurations have been used.

Straight, planar springs with arms having parallel sides are disclosed in Carroll, U.S. Pat. No. 4,770,367. Schoettle, et al., U.S. Pat. No. 4,717,091, discloses a similar reel spring having a central mounting portion that projects out of the plane of the spring. U.S. Pat. No. 4,496,118 to Oishi, et al. discloses straight, planar springs having transversely extending central mounting protrusions. V-shaped, planar springs are shown in Ogata, et al., U.S. Pat. No. 4,449,676, and U-shaped, planar springs are shown in Goto, U.S. Pat. No. 4,504,028. In Carroll, Schoettle, et al., and Goto, the spring arms are uniformly wide. In Oishi et al. and Ogata et al., the spring arm width decreases toward the ends.

U.S. Pat. No. 4,662,579 to Gelardi discloses a diamond-shaped spring which uniformly narrows from a central mounting portion to the distal ends which can include a portion of constant width. The Gelardi spring uses strengthening ribs to enable the spring to be coined from metal having a thickness less than 0.30 mm (0.012 in). Maehara, U.S. Pat. No. 4,544,062, discloses a similar diamond-shaped spring in which the distal ends are wider than their immediately adjacent arms. Both springs include four sides, with two adjacent sides forming an arm, and a diagonal which transversely bisects the spring between the distal ends. Sato, et al., U.S. Pat. No. 4,593,868, is directed to an improvement of the diamond-shaped spring and discloses a Z-shaped spring formed by the diagonal and two sides of the diamond shape. The Z has the same general dimensions of the diamond; it has a central, maximum width, and the width decreases toward the distal ends. Like Maehara, the ends are wider than the immediately adjacent portion of the arm.

None of these reel springs is a linear spring in which the narrowest portion is the central portion between oppositely extending arms which widen toward their distal ends. Additionally, all of these reel springs use symmetric mounting holes formed on either the transverse central axis, the longitudinal central axis, or both. None of the known reel springs includes asymmetrical mounting holes which prevent the reel spring from being connected to the upper housing improperly.

SUMMARY OF THE INVENTION

The reel spring of the present invention improves upon these known reel springs. The reel spring is used in a magnetic tape reel cassette, and has a longer longitudinal central axis and a shorter transverse central axis. The reel spring includes a transverse central axis and first and second arms. The transverse central axis has the smallest transverse width of the reel spring.

The two arms extend longitudinally from the transverse central axis to first and second ends. The arms increase in transverse width from the transverse central axis to the respective ends. Preferably, the arms increase uniformly from the transverse central axis to the ends to form a bow-tie shape. Due to this novel configuration, the reel spring thickness is less than 0.23 mm (0.009 in), 25% thinner than known reel springs, and the reel spring can be formed of this reduced thickness without additional strengthening ribs. The ends can be rounded, substantially parallel to each other, or substantially parallel with angled corners. When the corners are angled, the ends can be formed as three sides of a regular octagon.

The reel spring further includes first and second transverse crimps formed in the respective first and second arms. The crimps define therebetween a central base portion and first and second end portions extending at an angle from the central base portion to provide a biasing force. Preferably, the transverse crimps are equidistantly spaced from the longitudinal center of the reel spring. Thus, each arm includes one end portion and half of the central base portion. The reel spring also includes a mounting device which mounts the reel spring in the cassette. The mounting device includes first and second openings formed in the central base portion. These openings are spaced on respective sides of the transverse axis and on opposite sides of the longitudinal axis to ensure proper placement of the spring within the cartridge.

DETAILED DESCRIPTION OF PREFERRED EMBODIMENTS

Figure 1:
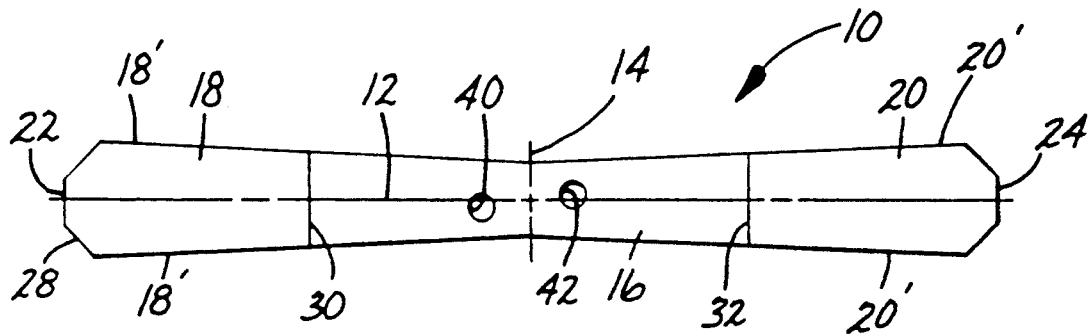
FIG. 1 is a top view of the reel spring according to the present invention.
Figure 2:
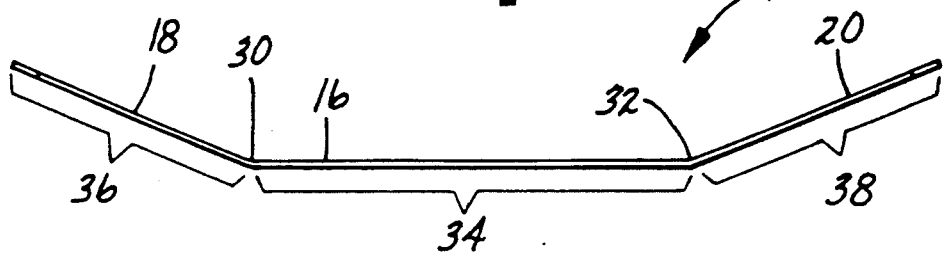
FIG. 2 is a side view of the reel spring of FIG. 1.

The reel spring 10 according to the present invention is shown in FIGS. 1 and 2. As best shown in the top view of FIG. 1, the reel spring 10 is mounted in the upper housing of a magnetic tape reel cassette, such as a video tape cassette 50. The reel spring 10 has a relatively longer longitudinal central axis 12 and a relatively shorter transverse central axis 14. The reel spring 10 includes first and second arms 18, 20 which meet at the transverse central axis. The reel spring 10 has the smallest transverse width at the transverse central axis 14. This transverse width is less than 6.22 mm (0.245 in).

The arms 18, 20 extend longitudinally from the transverse central axis 14 and culminate in first and second distal ends 22, 24. The transverse width of the first and second arms 18, 20 increases from the transverse central axis 14 to the first and second ends 22, 24. Thus, the transverse distance between the two longitudinal ends 18' of the first arm 18 and the two longitudinal ends 20' of the second arm 20 increases from the transverse central axis 14 toward the respective ends 22, 24 throughout their longitudinal length. Preferably, the width of the arms 18, 20 increases uniformly to form a bow-tie shape as shown. Moreover, due to the bending characteristics discussed below, the reel spring thickness can be 25–33% thinner than known reel springs having otherwise similar dimensions. This is accomplished without any additional structures such as strengthening ribs which complicate and increase manufacturing costs of the reel spring 10.

The preferred embodiment of the reel spring 10 has a bow-tie shape and is made of 302 or 201 stainless steel although plastics also can be used as long as the reel spring 10 remains resilient. In the preferred embodiment, the reel spring 10 is 100 mm (3.937 in) long when flat and has end 22, 24 widths of from 8.64 to 12.7 mm (0.340 to 0.5 in), and a central transverse width of 6.22 mm (0.245 in). This enables the reel spring 10 to be 0.23 mm (0.009 in) or 0.20 mm (0.008 in) thick rather than 0.304 mm (0.012 in) thick as with known reel springs. Thus, the reel spring 10 can be made from thinner sheets of material and manufacturing costs can be reduced.

Figure 4:
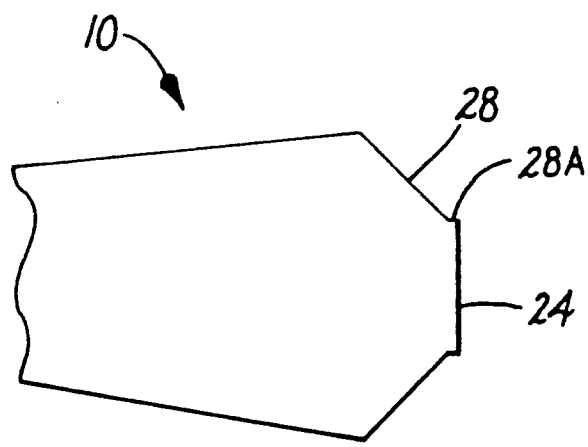
FIG. 4 is a partial top view of a modified embodiment of the reel spring of the present invention.
Figure 3:
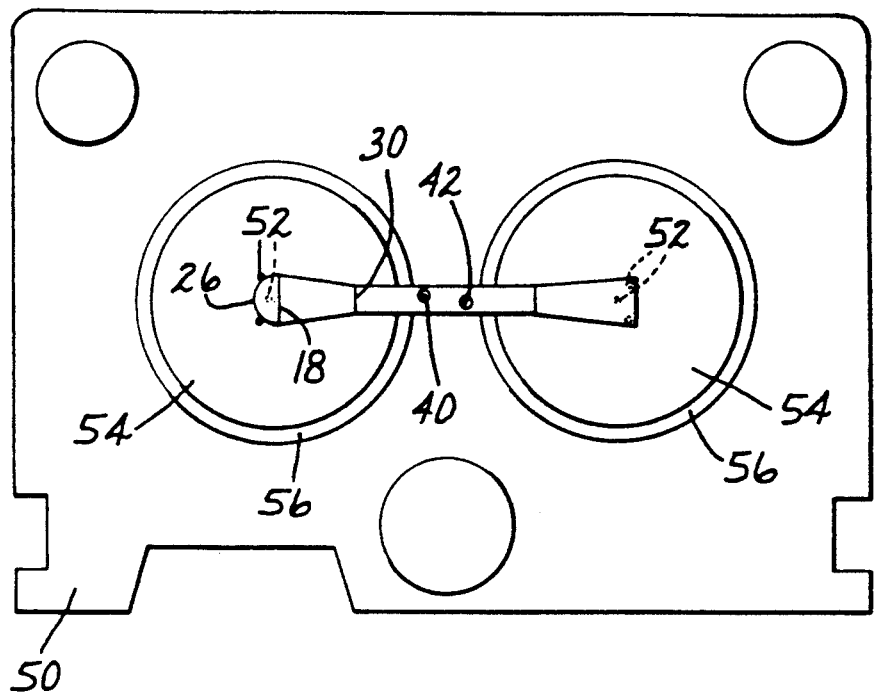
FIG. 3 is a bottom view of hybrid alternative embodiments of the ends and center portion of the reel spring mounted in a cassette.

The ends 22, 24 can be substantially parallel to the transverse center line 14, as shown by the right end 24 of FIG. 3, or rounded 26, as shown by the left end in FIG. 3. However, it is preferred that the ends 22, 24 be substantially parallel with angled corners 28, as shown in FIGS. 1 and 4. As illustrated in FIG. 3, which shows a bottom view of the reel spring 10 mounted in a cassette 50, the rounded and angled corners 26, 28 prevent the reel spring 10 from covering and interfering with some of the welds 52 on the flanges 54 of the tape reels 56 which attach the reel flange 54 to the reel hub (not shown). When the corners are angled 28, the first and second ends 22, 24 can be formed as three sides of a regular octagon with internal angles of 135°, although each resulting corner may be slightly rounded to extend the life of the stamping die.

Reel springs 10 can be formed from a single, continuous strip of material having a width equal to the ends 22, 24 of one spring so that minimal side trimming is required. Moreover, the reel spring 10 can be formed in only one forming operation because only a single crimp is required on each side of the transverse central axis 14. Alternatively, the strip of material can be two, three, or four springs wide. The reel springs 10 can be stamped out of this material strip end-to-end. When springs are formed end-to-end with the angled end 28 configuration, an approximately 0.15 mm (0.006 in) parallel-sided extension 28a is formed at the end of the end to facilitate forming and cutting operations, as illustrated in FIG. 4.

The reel spring 10 also preferably includes first and second transverse crimps 30, 32 formed in the respective first and second arms 18, 20. In alternative embodiments, more than one pair of crimps can be used or no crimps as described below. As best shown in the side view of FIG. 2, the crimps 30, 32 define therebetween a central base portion 34 and first and second end portions 36, 38 extending at an angle from the central base portion 34 to provide a biasing force. Thus, the arm 18 includes the end portion 36 and half of the central base portion 34, while the arm 20 includes the end portion 38 and the other half of the central base portion 34. Preferably, the first and second transverse crimps 30, 32 are equidistantly spaced from the longitudinal center of the reel spring 10. The central base portion 34 preferably is 47.6 mm (1.875 in) long, 23.8 mm (0.937 in) on either side of the transverse central axis 14, and each end portion 36, 38 is 26.19 mm (1.031 in) long. In the undeflected state, the end portions 36, 38 of the arms 18, 20 extend from the respective crimps 30, 32 at an angle of approximately 21.5° from the central base portion 34. At this angle, each end 20 22, 24 is spaced 10.3 mm (0.406 in) from the plane of the central base portion 34.

The larger end 22, 24 widths of from 8.63 to 12.7 mm (0.340 and 0.5 in), and the smaller central transverse width of 6.223 mm (0.245 in) enables the reel spring 10 to achieve a gram loading of approximately 315 near the middle of the 280 to 380 gram specification range specified for all VHS videotape cassettes. This 315 gram load is attained when the ends 22, 24 of the arms 18, 20 are deflected to a distance of 2.03 mm (0.080 in) from the mounting surface or central base portion 34, as occurs in a typical cassette.

In an alternative embodiment, the reel spring 10 can be formed without crimps, and a pair of ribs (not shown), approximately 1.52 mm (0.060 in) high can be formed on the upper housing of the cassette to bias the spring arms 18, 20 toward the tape reels. The ribs should be located on the upper housing to raise the spring arms 18, 20 the appropriate amount. Depending on the dimensions of these ribs, they can be positioned to raise the spring arms 18, 20 from a location corresponding to the crimps 30, 32 in the illustrated embodiments.

Figure 5:
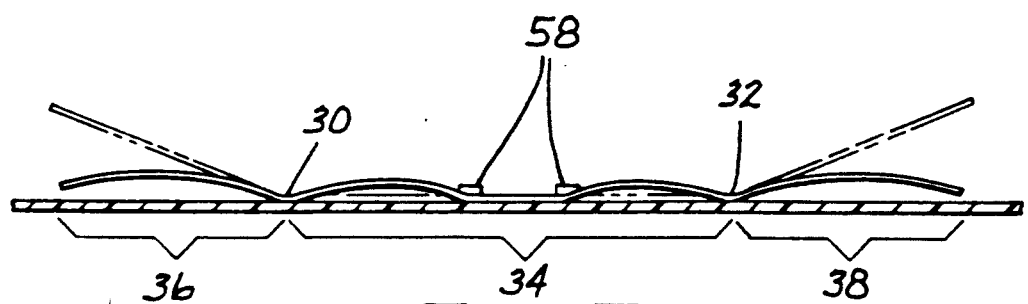
FIG. 5 is a partial cross-sectional view of the cassette upper wall having a reel spring mounted thereto with the reel spring shown in the undeflected state (solid lines) and the deflected state (broken lines).

The reel spring 10 is mounted in the cassette 50 using first and second openings 40, 42 formed in the central base portion 34. The openings 40, 42 are shown as being round and having a 3.25 mm (0.128 in) diameter although other sizes and shapes can be used. Preferably, the openings 40, 42 are equidistantly spaced on respective sides of the transverse central axis 14. The openings 40, 42 are also disposed on opposite sides of the longitudinal central axis 12 so that they are asymmetric with respect to both the transverse central axis 14 and the longitudinal central axis 12. In the illustrated embodiments the openings 40, 42 lie along a line that crosses the intersection of the longitudinal central axis 12 and the transverse central axis 14. This line forms an angle of 3° with the longitudinal central axis 12 to insure proper placement of the reel spring 10 within the cartridge. In a reel spring 10 that is 100 mm (3.937 in) long, the openings 40, 42 are located 0.13 mm (0.005 in) from the longitudinal central axis 12 and are 5.26 mm (0.207 in) on either side of the transverse central axis 14. The asymmetry of the openings 40, 42 around the longitudinal central axis 12 and the transverse central axis 14 prevents assembly of the reel spring 10 in the cartridge in a misaligned, upside down manner. As shown in FIG. 5, when the reel spring 10 is mounted in the cartridge 50, the openings 40, 42 are placed on posts 58 formed on the upper wall of the cassette 50 and are welded in position.

Merely reducing the thickness of the reel spring 10 and increasing the width of the ends 22, 24 do not combine to produce the same stiffness or gram loading as prior art springs with otherwise identical dimensions. An additional change is necessary because the stiffness is a function of the thickness raised to the third power and the width raised to the first power. The location of the crimps 30, 32 in the reel spring 10 compensates for this to provide the required gram loading and stiffness. The crimps 30, 32 are located closer to the ends 22, 24, substantially half way between the transverse central axis 14 and the respective end 22, 24, as described above. This increases the angle between the undeflected end portions 36, 38 and the central base portion 34 to approximately 21.5°, and increases the gram loading of the spring on the tape reels 56. Furthermore, sufficient gram loading is achieved because the reel spring 10 serves as a double action spring. As shown in FIG. 5, when the ends 22, 24 of the reel spring 10 are deflected, there is a bend formed in the first and second end portions 36, 38. Additionally, reverse bends are formed between the crimps 30, 32 and the respective first and second openings 40, 42. The crimps 30, 32 serve as the fulcrums for these two bending actions. In FIG. 5, the deflected reel spring 10 is superimposed on a broken line undeflected reel spring 10.

In alternative embodiments, the openings 40, 42 may be disposed on the same side of the longitudinal central axis 12 and symmetric with the transverse central axis 14. Additionally, the openings 40, 42 can be placed on the same side of the transverse central axis 14 or on either the longitudinal or transverse central axes 12, 14. However, these locations make the reel spring 10 prone to misalignment when mounted in the cartridge. Also, the central base portion 34 width can be constant with the width increasing only at the end portions 36, 38, between the respective crimps 30, 32 and distal ends 22, 24, as shown in FIG. 3; or only a portion of the central base portion 34, such as that bordered by the mounting openings 40, 42, can have constant width, with the arms 18, 20 width increasing only outside of the openings 40, 42. Additionally, although specific dimensions have been given for the reel spring 10, other shapes and sizes of reel springs 10 can be used especially with differently sized cassette reels and different reel spacings.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

I claim:

1. A reel spring for use in a tape cassette, the reel spring having a longitudinal central axis and a transverse central axis wherein the longitudinal central axis is longer than the transverse central axis, the reel spring comprising first and second arms extending longitudinally from the transverse central axis and culminating in first and second ends, wherein the reel spring has the smallest transverse dimension at the transverse central axis and the first and second arms increase uniformly in transverse dimension from the transverse central axis toward the first and second ends to form a bow-tie shape, and wherein at a first location on the first and second arms the transverse dimension is less than that at a second location on the first and second arms closer to the respective ends than the first location.

2. The reel spring of claim 1 wherein the first and second ends are rounded.

3. The reel spring of claim 1 wherein the first and second ends are substantially parallel to each other and have angled corners.

4. The reel spring of claim 3 wherein the first and second ends are formed as three sides of a regular octagon.

5. The reel spring of claim 1 further comprising first and second transverse crimps formed in the respective first and second arms which define a central base portion therebetween and first and second end portions extending at an angle from the central base portion.

6. The reel spring of claim 5 wherein the first and second transverse crimps are equidistantly spaced from the transverse central axis of the reel spring.

7. The reel spring of claim 1 further comprising means for mounting the reel spring in the cassette, the mounting means including first and second openings formed on the respective first and second arms, wherein the first and second openings are spaced on opposite sides of the transverse central axis and on opposite sides of the longitudinal central axis to be asymmetric with respect to both the transverse central axis and the longitudinal central axis to insure proper placement of the reel spring within the cartridge.

8. The reel spring of claim 1 further comprising means located in a transverse central portion which is planar for mounting the reel spring in the cassette, wherein the mounting means comprises holes.

9. A reel spring for use in a tape cassette, the reel spring having a longer longitudinal central axis and a shorter transverse central axis and comprising:
first and second arms extending longitudinally from the transverse central axis and culminating in first and second ends; and
first and second transverse crimps formed in the respective first and second arms which define a central base portion therebetween and first and second end portions extending at an angle from the central base portion to provide a biasing force, wherein the first and second transverse crimps are equidistantly spaced from the transverse central axis of the reel spring, and the first arm includes the first end portion and half of the central base portion and the second arm includes the second end portion and the other half of the central base portion;
wherein the reel spring has the smallest transverse dimension at the transverse central axis and the first and second arms increase in transverse dimension from the transverse central axis toward the first and second ends to form a bow-tie shape.

10. The reel spring of claim 9 further comprising means for mounting the reel spring in the cassette, the mounting means including first and second openings formed on the respective first and second arms, wherein the first and second openings are spaced on opposite sides of the transverse central axis and on opposite sides of the longitudinal central axis to be asymmetric with respect to both the transverse central axis and the longitudinal central axis to insure proper placement of the reel spring within the cartridge.

* * * * *